(12) United States Patent
Chan

(10) Patent No.: US 6,405,274 B1
(45) Date of Patent: Jun. 11, 2002

(54) ANTICIPATORY LOCK MODE CONVERSIONS IN A LOCK MANAGEMENT SYSTEM

(75) Inventor: Wilson Wai Shun Chan, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/222,012

(22) Filed: Dec. 30, 1998

(51) Int. Cl.[7] .............................................. G06F 13/00
(52) U.S. Cl. .......................................... 710/200; 707/8
(58) Field of Search ................... 710/200, 40; 709/229, 709/203, 226, 104; 707/8; 370/431

(56) References Cited

U.S. PATENT DOCUMENTS

| 5,454,108 A | * | 9/1995 | Devarakonda et al. |
| 5,920,872 A | * | 7/1999 | Grewell et al. |
| 6,052,731 A | * | 4/2000 | Holdsworth et al. |

* cited by examiner

*Primary Examiner*—Gopal C. Ray
(74) *Attorney, Agent, or Firm*—Hickman Palermo Truong & Becker LLP; Carina M. Tan; Edward A. Becker

(57) ABSTRACT

A method and apparatus for managing access to a resource using anticipatory lock conversions in a distributed lock management system is provided. According to the method, when an entity requests a lock on a resource, the entity is granted, if possible, a lock with a more restrictive lock mode than is required if it is determined that the entity may require the more restrictive lock mode in the near future.

20 Claims, 14 Drawing Sheets

ANTICIPATORY LOCK MODE CONVERSIONS IN A LOCK MANAGEMENT SYSTEM

FIELD OF THE INVENTION

The present invention relates to the efficiency of data accessing techniques, and more specifically, to Distributed Lock Manager (DLM) lock conversions.

BACKGROUND OF THE INVENTION

In order to promote efficiency, computer networks have been developed in which processes running on many computer devices or "nodes" can share resources. For example, instead of having to purchase one printer for every computer, users may purchase a single printer that may be connected to a network that has many computers. Processes on each computer on the network access the printer only when the processes require the printer.

Moreover, in some circumstances, certain types of resources, such as data blocks of a storage medium or tables stored on a storage medium must necessarily be shared so that all the users on the network get the same information. For example, consider a hypothetical company, Acme, which needs to track its inventory. A database containing Acme's inventory information and which is constantly updated by various users in the company is useful only if all users of the database have access to the same information at any given time. On the other hand, if Acme maintained several independent databases on the same set of inventory, with some users updating some of the information on one database and some other users updating information on a different database, then none of these databases, by themselves, would correctly reflect the inventory in Acme. Thus, maintaining a multiplicity of independent inventory databases in Acme would be meaningless because the goal is to enable the users to share with each other the most up-to-date and accurate information on Acme's inventory in the most efficient manner.

However, the sharing of resources cannot be done in a haphazard fashion but rather in a managed and orderly fashion. For example, a resource such as a table stored on a storage medium, may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to the resource. There are many types of locks. Some types of locks may be shared by many processes, while other types of locks prevent any other locks to be granted on the same resource.

Due to the various permissions and guarantees associated with these locks, certain lock combinations are not allowed. For example ownership of an exclusive lock grants a process permission to do anything with a resource, and guarantees that no other process is performing any operation on the resource. Thus if a process owns an exclusive mode lock on a resource, then no other process can be granted any lock other than a NULL mode lock, which grants a process no permission to access the resource in any manner. Thus, the ownership of locks has to be managed in a manner to provide for efficient accessing of resources.

One management approach is to use a lock manager, an entity that is responsible for granting, queuing, and keeping track of locks on one or more resources. Before a process can perform an operation on a resource, the process is required to obtain a lock that grants to the process the right to perform the desired operation on the resource. To obtain a lock, a process transmits a request for the lock to a lock manager. To manage the use of resources in a network system, lock managers are executed on one or more nodes in the network. Associated with the use of lock managers is an overhead in the form of messages being passed back and forth between the nodes of the computer network. For example, in order to obtain a lock, a process residing on one node may have to send a message to a lock manager residing on a different node.

According to one implementation, a lock manager implements two types of objects: a resource object and a lock. Resource objects are data structures that correspond to actual resources. An application that uses a lock manager establishes a mapping between actual resources and resource objects. Each resource object has two queues: a granted queue and a convert queue. The granted queue is an unordered list of locks that have been granted. The convert queue is a partially ordered list of locks that have been requested, but not yet granted. Typically, a request for a lock is actually a convert request, where a process holding a lock is requesting that the lock it holds be converted from one mode of lock to a different mode of lock.

Locks are data structures that identify a process and a lock mode. Lock managers attach locks to the granted queues of resource objects to indicate that the process identified in the lock has been granted a lock of the type indicated in the lock on the resource that corresponds to the resource object to which the lock is attached.

FIG. 1 is a block diagram illustrating a typical lock manager 106. Lock manager 106 is a process that is configured to manage a resource object 100 stored in a memory 108. The resource object includes a granted queue 102 and a convert queue 104. Lock manager 106 has attached three locks 110, 112 and 114 to the granted queue 102, and one convert request 130 to the convert queue 104.

All locks and convert requests have a process ID portion and a lock mode portion. The process ID portion 116 of lock 110 indicates that a process PROC_1 owns lock 110, and the lock mode portion 118 of lock 110 indicates that lock 110 is an exclusive lock. The process ID portion 120 of lock 112 indicates that lock 112 is owned by a process PROC_2, and the lock mode portion 122 of lock 112 indicates that lock 112 is a NULL mode lock. The process ID portion 124 of lock 114 indicates that lock 114 is owned by a process PROC_3, and the lock mode portion 126 of lock 114 indicates that lock 114 is a NULL lock. The process ID portion 132 of convert request 130 indicates that convert request 130 is associated with process PROC_4, and the lock mode portion 136 of convert request 130 indicates that PROC_4 currently holds a NULL mode lock on the resource. In addition to a lock mode portion 136, convert request 130 has a requested mode portion 134 that indicates that PROC_4 is requesting an exclusive mode lock.

Lock manager 106 has attached locks 110, 112 and 114 to granted queue 102, indicating that PROC_1 currently has exclusive ownership of the resource that corresponds to resource object 100. Lock manager 106 has attached convert request 130 to the convert queue 104, indicating that PROC_4 has requested but has not yet been granted an exclusive mode lock on the resource associated with resource object 100.

Information pertaining to any given resource may be stored in the resource object that corresponds to the resource. Each resource object is stored in the memory of a single node. The node on which a resource object is stored is referred to as the master node for the resource object.

According to one lock management approach, a process initially establishes a NULL mode lock on all resources that the process will possibly use. Then, when the process actually requires access to a resource, the process requests that its NULL mode lock be converted to a lock that grants to the process the rights to perform the desired operation.

For example, to delete a resource such as a table stored on a storage medium, a process must obtain an exclusive mode lock on the resource object that corresponds to the table. To obtain the exclusive mode lock, the process transmits a message to the lock manager that controls the resource object that corresponds to the table. In the message, the process requests that its current NULL mode lock be converted to an exclusive mode lock. If no other process has requested a conversion, and if no currently granted locks would prevent the grant of an exclusive mode lock, then the current lock held by the requesting process is converted to an exclusive mode lock. Once the lock manager performs the requested conversion, the lock manager transmits a message to the requesting process to indicate that the requested conversion operation has been performed.

If a process requires access to read data from a table, the process must obtain a shared mode lock. To obtain a shared mode lock, the process requests the lock manager that controls the resource object that corresponds to the table to convert its current lock to a shared mode lock. If no other process has requested a conversion, and if no currently granted locks would prevent the grant of a shared mode lock, then the current lock held by the requesting process is converted to a shared mode lock.

If an exclusive mode lock has already been granted for the table, then a shared mode lock cannot be granted. Under these circumstances, the lock convert request is placed on the convert queue of the resource object. When the blocking process is ready to release its exclusive lock, the blocking process may send a lock downgrade request to the lock manager. The lock manager responds by converting the exclusive mode lock to a lesser lock that allows the grant of the shared mode lock. The shared mode lock is then granted by moving the shared mode lock request from the convert queue to the granted queue and transmitting a message to the requesting process to inform the requesting process that the shared mode lock has been granted.

The convert queue of a resource object is a partially ordered list that holds all outstanding (ungranted) lock requests. If any outstanding lock requests have not been granted, one of the ungranted lock requests will be at the "head" of the convert queue. Even if the currently granted locks do not prevent a lock manager from granting a particular lock request, the lock request is placed on the convert queue if the convert queue is not empty. This policy prevents "livelocks", where one process cannot make progress in the system while other processes can.

In networked computer systems, some or all of the processes that are holding and requesting locks on a particular resource may be on different nodes than the node that contains the resource object that corresponds to the resource. For example, the process desiring a lock and the lock resource may reside within different nodes of a multi-processor machine, or on different workstations in a local area network. Consequently, all of the messages that pass between the lock-requesting processes and the lock manager must be transmitted between nodes over the network. The computational power that must be expended to facilitate such inter-node messages is significant relative to the power required for intra-node communication. In addition, inter-node communication is generally slower than intra-node communication. Further, the inter-node traffic thus generated reduces the throughput available for other types of inter-node traffic, which may be significant when the inter-node traffic is between workstations on a network.

FIG. 2 illustrates a computer system in which four nodes 202, 206, 210 and 214 are connected through a network 216. Nodes 202, 206 and 210 are executing process 204 (PROC_1), process 208 (PROC_2) and process 212 (PROC_3), respectively. Lock manager 106 is resides on node 214. Every time one of processes 204, 208 and 212 wish to acquire, upgrade, downgrade or release a lock on a resource object controlled by lock manager 106, the processes must send messages to node 214 through network 216. Every time a convert request is granted on lock manager 106, a message must be sent from node 214 to the node on which resides the process that requested the lock conversion.

In yet another approach, managing access to resources is performed by a Distributed Lock Manager (DLM). The DLM provides for a distributed resource object architecture to spread the lock management processing for any given resource among multiple nodes as opposed to a centralized resource object, and to reduce the amount of inter-node traffic required to perform lock management operations. Due to the high computational costs associated with inter-node communication, a further reduction in inter-node traffic is desirable.

Based on the foregoing, it is clearly desirable to provide a mechanism for allocating locks between processes that requires less inter-node traffic.

SUMMARY OF THE INVENTION

A method and apparatus for managing access to a resource using anticipatory lock conversions in a distributed lock management system is provided. According to one aspect of the invention, a lock conversion request with respect to any resource may contain an anticipatory lock conversion request. A distributed lock manager, if it can, will grant the more restrictive lock mode indicated by the anticipatory lock conversion request.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
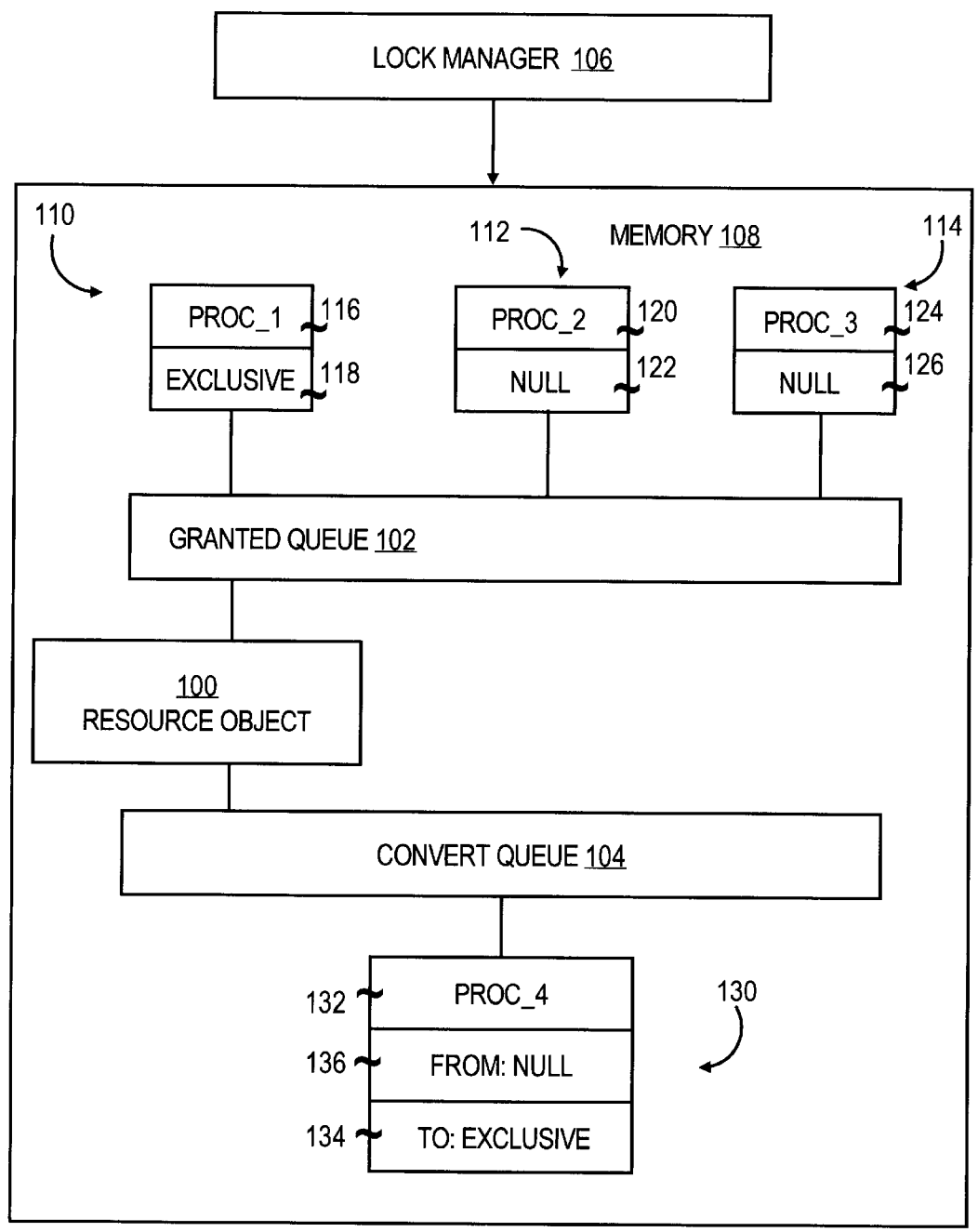
FIG. 1 is a block diagram of a centralized lock manager object.
Figure 2:
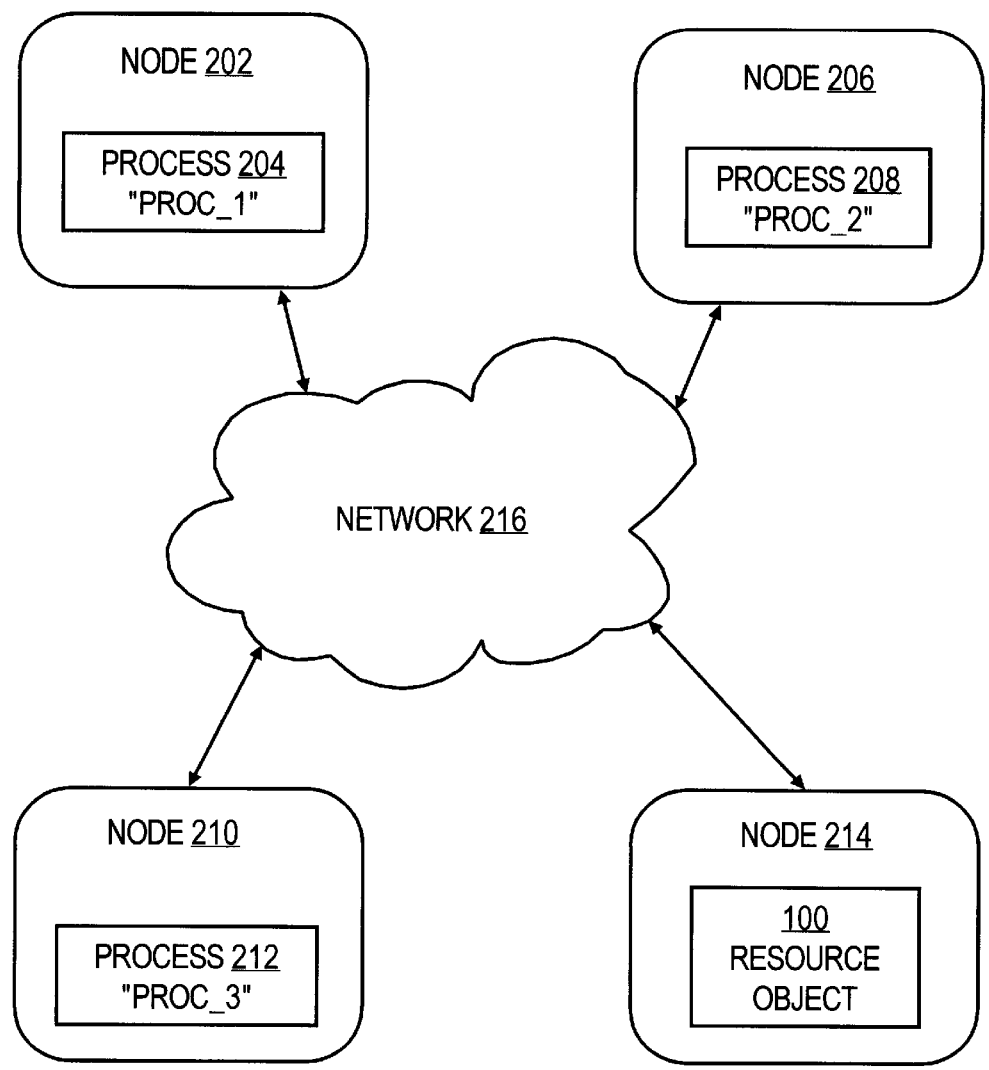
FIG. 2 is a block diagram illustrating processes on three nodes attempting to obtain permission to use a resource by communicating over a network with a central resource object.

A method and apparatus for managing access to a resource using anticipatory lock conversions in a Distributed Lock Manager (DLM) system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

As shall be explained in greater detail hereafter, a lock management system that is capable of performing anticipatory lock conversions is provided. An anticipatory lock conversion is a lock conversion that is performed before it is required in anticipation that it will be required in the near future.

According to one aspect of the invention, a lock management system is configured to handle both required lock convert requests and anticipatory lock convert requests. Required lock convert requests are requests for a lock mode on a resource, where the lock mode being requested is currently required by the requesting entity to perform some operation on the resource. Anticipatory lock convert requests are requests for a lock mode on a resource, where the lock mode being requested is not required by the requesting entity, but may be required for some operation that the entity may perform in the near future.

According to one embodiment, anticipatory lock convert requests are sent in the same message as required lock convert requests when a less restrictive lock mode is currently required and a more restrictive lock mode will likely be required in the near future. In such an embodiment, a lock manager performs anticipatory lock conversions when (1) the lock manager receives a required lock convert request for a lesser lock mode, (2) the request contains an anticipatory conversion request for a more restrictive lock mode, and (3) no currently granted locks prevent the more restrictive lock mode from being granted.

If the lock manager is able to grant the anticipatory lock convert request, then the entity does not have to send the lock manager a subsequent conversion request for the more restrictive lock mode if and when the entity actually requires the more restrictive lock mode. Assuming that the lock manager and the requesting entity are on different nodes, the amount of inter-node traffic related to lock management is reduced by half because the request-response messages that would otherwise be required for the entity to obtain the more restrictive lock mode are avoided.

LOCK CONVERT REQUEST TYPES

There are three types of lock convert requests. The three types are as follows:

(1) Required lock convert request;

(2) Combined lock convert request which is a combination of a required lock convert request plus an anticipatory lock convert request; and (3) Stand-alone anticipatory lock convert request which is the remaining lock convert request after the required lock convert request in a combined lock convert request is granted.

LOCK CONVERT REQUEST HANDLING

Figure 3A:
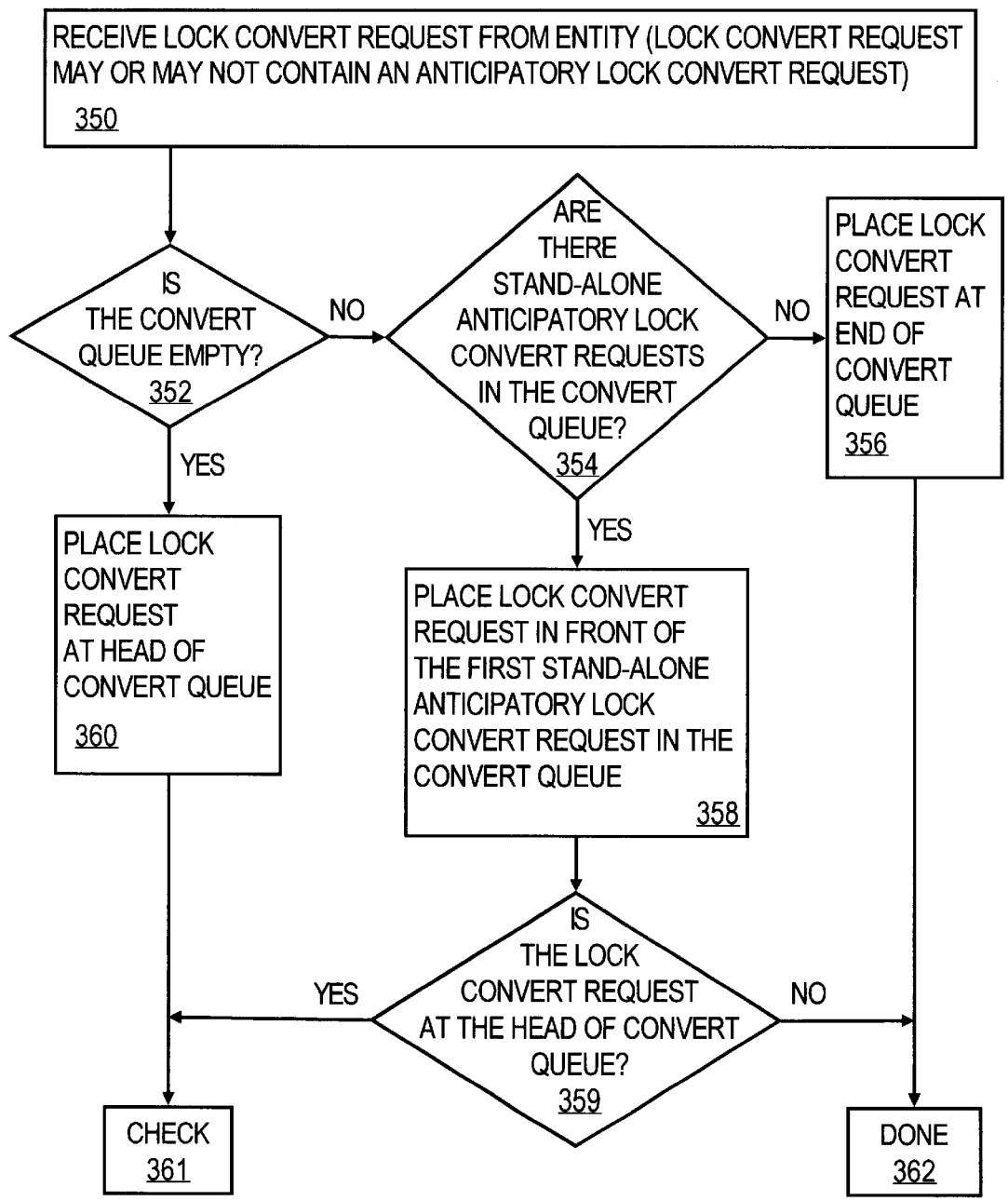
FIG. 3A is a flow chart illustrating one embodiment of steps a lock manager performs to queue incoming lock convert requests.

FIG. 3A is a flow chart illustrating the steps a lock manager performs to queue incoming lock convert requests. At step 350, the lock manager receives a lock convert request from an entity. The lock convert request from the entity may or may not contain an anticipatory lock convert request.

At step 352, the lock manager determines whether the convert queue for the resource is empty. If there are any lock convert requests in the convert queue, control passes to step 354. Otherwise, control passes to 360.

At step 354, the lock manager determines whether there are any stand-alone anticipatory lock convert requests already in the convert queue. If there are no anticipatory lock convert requests in the convert queue, then control passes to step 356 where the lock manager places the received lock convert request at the end of the convert queue. However, if there are stand-alone anticipatory lock convert requests in the convert queue, control passes to step 358. At step 358, the lock manager places the received lock convert request in front of the first stand-alone anticipatory lock convert request found in the convert queue because all other lock requests take precedence over stand-alone anticipatory lock convert requests in the convert queue. At step 359, the lock manager determines whether the received lock convert request is at the head of the convert queue. If the received lock convert request is at the head of the convert queue, then control passes to step 361. Otherwise, control passes to step 362, the end of the queuing process for incoming lock convert requests.

Figure 3B:
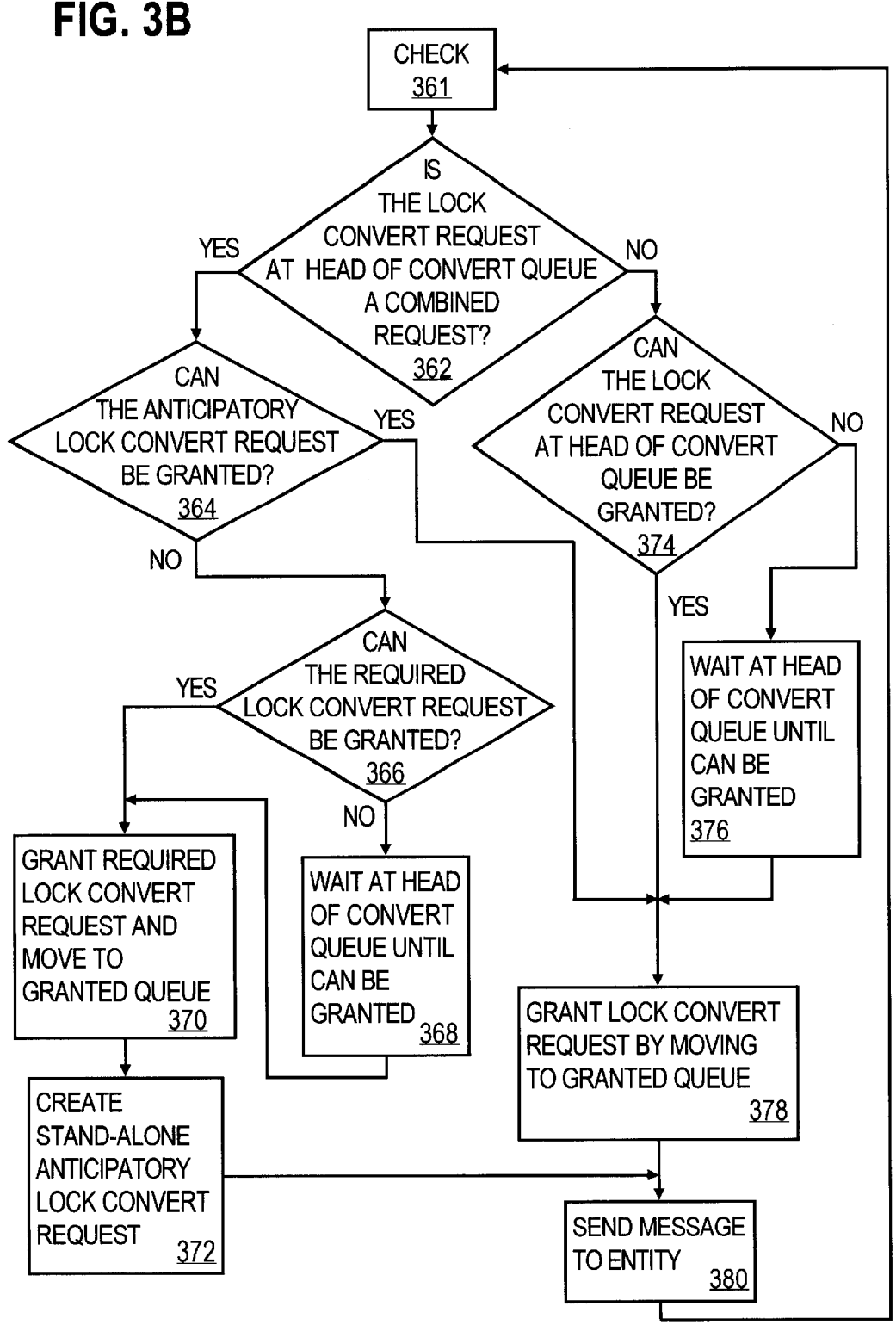
FIG. 3B is a flow chart illustrating one embodiment of steps performed by a lock manager with respect to lock conversions.

FIG. 3B is a flow chart illustrating the steps performed by a lock manager in managing lock conversions. At step 361, the lock manager begins the process of checking whether the lock convert request at the head of the covert queue can be granted. At step 362, the lock manager determines whether the lock convert request at the head of convert queue is a combined lock convert request. If the lock convert request at the head of the convert queue is a combined lock convert request, control passes to step 364. Otherwise, control passes to step 374.

At step 364, the lock manager determines whether the anticipatory lock convert request specified in the combined lock convert request can be granted. If the anticipatory lock convert request can be granted, control passes to step 378 where the lock manager grants the lock convert request by moving it to the granted queue. Otherwise, control passes to step 366.

At step 366, the lock manager determines whether the required lock convert request can be granted. If the required lock convert request can be granted, control passes to step 370. Otherwise, control passes to step 368. At step 370, the lock manager grants the required lock convert request by moving it to the granted queue and control passes to step 372 where a stand-alone anticipatory lock convert request is created. Control then proceeds to step 380 where the lock manager sends a message to the entity that sent the lock convert request indicating that the lock convert request has been granted. Next control passes back to step 361. At step 368, the required lock convert request waits at the head of the convert queue waits until it can be granted. When the required lock convert request that is waiting at the head of the convert queue can be granted, control passes to step 370, followed by steps 372 and 380 explained above.

At step 374, the lock manager determines whether the lock convert request at the head of the convert queue can be granted. If the lock convert request at the head of the convert queue can be granted then control passes to step 378, followed by step 380 explained above. Otherwise, control passes to step 376. At step 376 the lock convert request waits at the head of the convert queue until it can be granted. When the lock convert request at the head of the convert queue can be granted, control passes to step 378, followed by step 380 explained above.

Assuming that the lock manager and the requesting entity are on different nodes, the above is an example of how inter-node traffic related to lock assignments can be reduced by half. As can be seen at step 364, the anticipatory lock convert request, which is the more restrictive lock mode, is granted as soon as possible, without taking precedence over other required lock convert requests that are not part of a combined request. Thus the inter-node request-response messages that would otherwise be required for the entity to obtain the more restrictive lock mode are halved.

DETECTING THE POTENTIAL FOR SUBSEQUENT REQUEST FOR A MORE RESTRICTIVE LOCK MODE

As described above, entities may include an anticipatory lock conversion request within their required lock conversion request when they anticipate that they may require a more restrictive lock mode in the near future. Various techniques may be used to determine when the inclusion of an anticipatory conversion request is justified.

For example, the requesting entity may employ predictive logic to predict the likelihood that a more restrictive lock mode will be required in the future. The predictive logic may be invoked when the entity must send a required conversion request. If the predictive logic determines that the likelihood exceeds a certain threshold, then a lock anticipatory conversion request is sent along with the required lock conversion request.

Alternatively, the decision of whether to include an anticipatory lock conversion request with a required lock conversion request may be based on the type of operation that necessitates the required lock conversion request. Thus, if it is known that a particular type of read operation is frequently followed by an update operation, then the request to obtain a shared read lock to perform the read operation may include an anticipatory lock conversion request for the exclusive lock mode that would be required to perform the update operation.

The "SELECT FOR UPDATE" operation supported in many database systems is an example of an operation that reads ("selects") data, and is frequently followed by an attempt to update that data. To read the data, the process performing the "SELECT FOR UPDATE" operation only requires a shared mode lock, but to perform any subsequent update, the process requires an exclusive mode lock. Thus, according to one embodiment, a database buffer cache that manages access to data sends, on behalf of any process that is executing a SELECT FOR UPDATE command on the data, a request for a shared mode lock on the data, and includes in that request an anticipatory lock conversion request for an exclusive lock mode on the data.

ANTICIPATORY LOCK REQUESTS IN A DISTRIBUTED LOCK MANAGEMENT SYSTEM

According to one embodiment of the invention, a distributed lock management system is used to perform anticipatory lock conversions. As shall be explained in greater detail hereafter, shadow resource objects that reside on the same node as a process grant locks to the process. The shadow resource objects, in turn, are granted permission to grant locks by communicating with master resource objects.

There is a master resource object for each resource. The master resource object includes a convert queue used to maintain a partially ordered list of convert requests made by the shadow resource objects on the various other nodes. The convert queue on the master resource object is referred to as the "global convert queue". The convert request at the head of the global convert queue is referred to as the "global head request". As shall be explained in greater detail below, information about the global head request is propagated to the shadow resource objects in the system, and is one factor used by the shadow resource objects to determine whether lock convert requests can be granted.

DISTRIBUTED ARCHITECTURE OVERVIEW

Figure 3C:
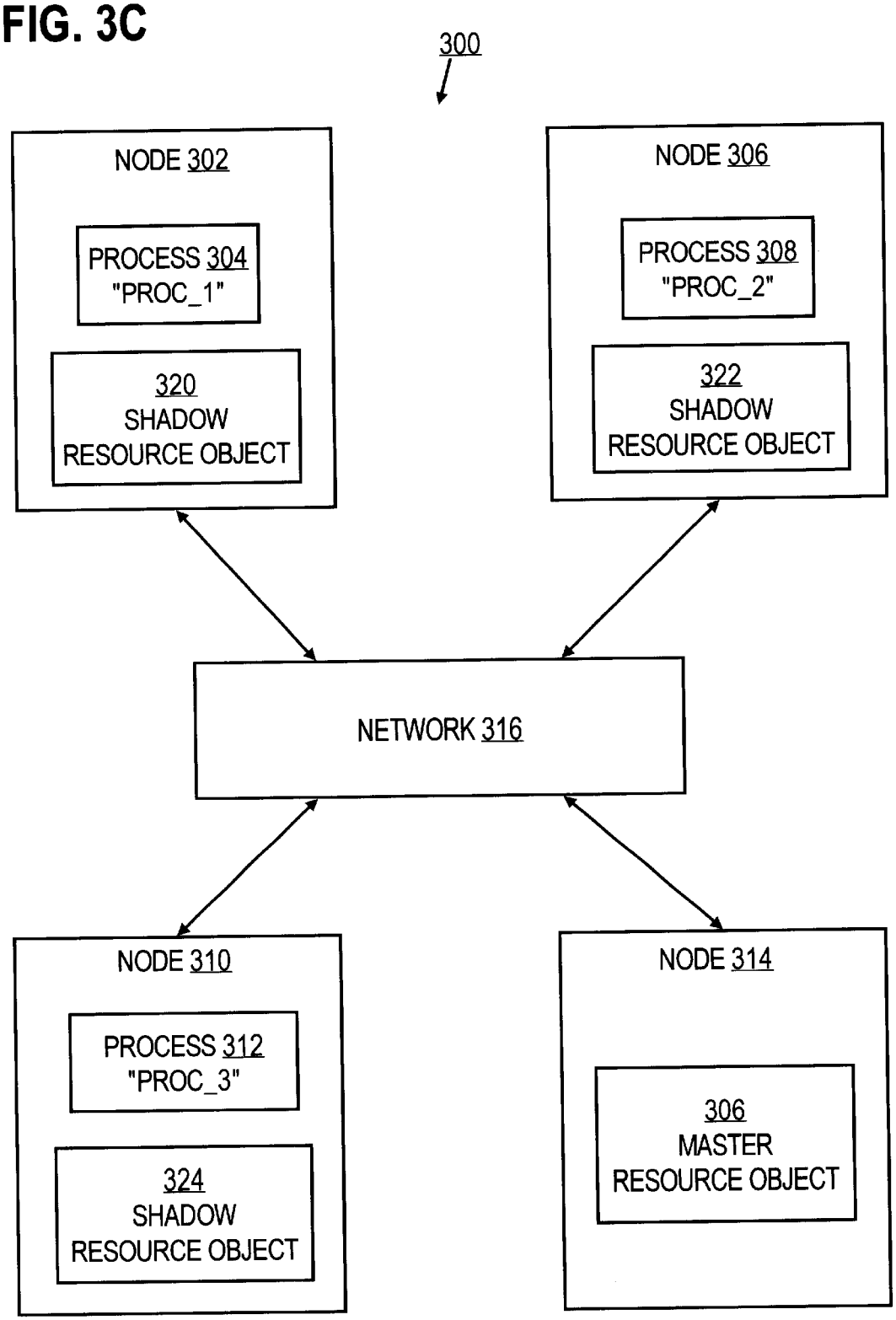
FIG. 3C is a block diagram illustrating one embodiment of a distributed lock management system.

FIG. 3C illustrates a lock management system 300 that uses distributed resource objects according to an embodiment of the invention. For the purposes of explanation it shall be assumed that system 300 is being used to manage access to a table "TABLE_1" in a database. In system 300, locks for TABLE_1 are managed using a master resource object 306 and a plurality of shadow resource objects 320, 322 and 324. The master resource object resides on node 314. The plurality of shadow resource objects 320, 322 and 324 are distributed among the nodes 302, 306 and 310 that have processes that have requested locks on TABLE_1.

The resource objects that are discussed herein may be implemented within various types of entities, including processes, threads, or the kernel of an operating system. In the following discussion, a resource object shall be said to perform an action if the entity that implements the resource object performs the action.

The distributed lock management system 300 has two tiers of locks. At the first tier, the master resource object 306 for TABLE_1 has attached thereto locks that are owned by the various shadow resource objects. At the second tier, each shadow resource object for TABLE_1 has attached thereto locks that are owned by the processes that (1) have requested locks on TABLE_1 and (2) are located in the same node as the shadow resource object.

Each shadow resource object also maintains mode held data, global convert mode data, and master knowledge data. Mode held data indicates the lock mode held by the shadow resource object at the master resource object. Global convert mode data indicates the mode requested by the current global head request. Master knowledge data indicates the information that the shadow resource object has most recently sent to the master resource object about the shadow resource object. The contents and use of this data shall be described in greater detail below.

DISTRIBUTED LOCK MANAGEMENT OPERATION OVERVIEW

When a process desires to perform an operation on TABLE_1 that is not permitted by the lock currently held by the process, the process does not transmit a lock upgrade request to master resource object 306 over network 316 (see FIG. 3C). Rather, the process transmits a lock upgrade request to the shadow resource object that is stored on the same node as the process. The shadow resource object for TABLE_1 grants or queues the lock request based on the locks attached to its granted queue, the mode requested by the convert request at the head of its local convert queue (the "local head request") and the mode requested by the global head request, without communicating with the master resource object unless the lock requested by the process is more restrictive than the lock on TABLE_1 currently held by the shadow resource object.

According to one aspect of the invention, processes request lock operations by interacting with local shadow resource objects, and because this interaction takes place within a single a node, it is performed more efficiently than the inter-node interaction required by centralized lock management mechanisms. Except when the shadow resource objects need to change the type of lock that they hold on a resource, lock operations performed for the processes do not generate inter-node traffic. In many circumstances, the number of lock requests issued by shadow resource objects will be small relative to the number of process-issued lock requests. Consequently, the amount of inter-node traffic generated by the distributed lock manager system 300 may be substantially lower than centralized lock manager systems. In some circumstances, the shadow resource object may send a combined lock convert request to the master resource object. At the time a shadow resource object makes an inter-node communication with the master resource object to request a change in the type of lock that the shadow resource holds on a resource, the shadow resource object may also indicate that the shadow resource object may potentially require a more restrictive lock mode on the resource in the near future. If possible, the master resource object grants the more restrictive lock mode to the shadow resource object, and informs the shadow resource object that the more restrictive lock mode has been granted. Thus, in the event that the shadow resource object does need the more restrictive lock mode on the resource, the shadow resource object is able to avoid making another inter-node communication with the master resource object and vice versa.

The operation of the various components of system 300 shall be described in greater detail below.

OPERATION OF A MASTER RESOURCE OBJECT

Figure 4:
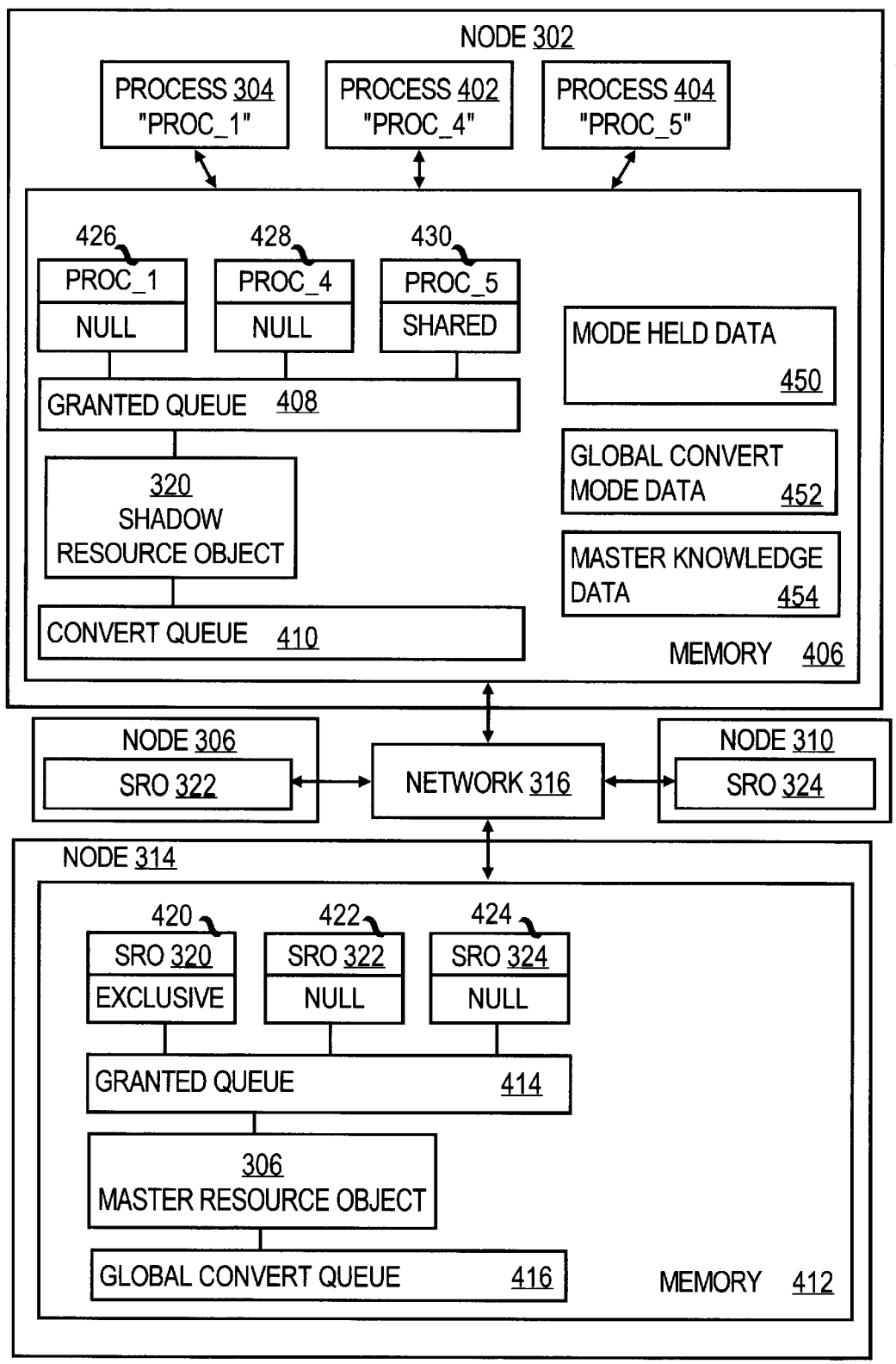
FIG. 4 is a block diagram illustrating various components of the distributed lock management system of FIG. 3C in detail.

Referring to FIG. 4, it illustrates nodes 302 and 314 of FIG. 3C in greater detail. Node 314 includes master resource object 306 and is coupled to network 316 so that master resource object 306 is able to receive messages over network 316. Master resource object 306 corresponds to an actual resource, such as a printer, modem, or data block. For the purposes of explanation, it shall again be assumed that the managed resource is a table, "TABLE_1", of a database.

Master resource object 306 has a granted queue 414 to which are attached locks on TABLE_1 that have been granted to shadow resource objects by master resource object 306, and a global convert queue 416, to which are attached locks on TABLE_1 that have been requested by shadow resource objects but have not yet been granted. As explained above, master resource object 306 receives lock operation requests from shadow resource objects, not from the processes that actually will use TABLE_1. Therefore, the locks 420, 422 and 424 attached to the queues of master resource object 306 do not have a process ID portion. Rather, they have a shadow resource object ID portion that identifies the shadow resource object that owns the lock. It should be noted, however, that to the extent that a master resource object is also serving as a shadow resource object to processes executing on the same node as the master resource object, the locks on the resource object may include locks associated with processes that use the resource.

In the illustrated example, lock 420 is an exclusive mode lock that has been granted to shadow resource object 320, lock 422 is a NULL mode lock that has been granted to shadow resource object 322, and lock 424 is a NULL mode lock that has been granted to shadow resource object 324.

Figure 5A:
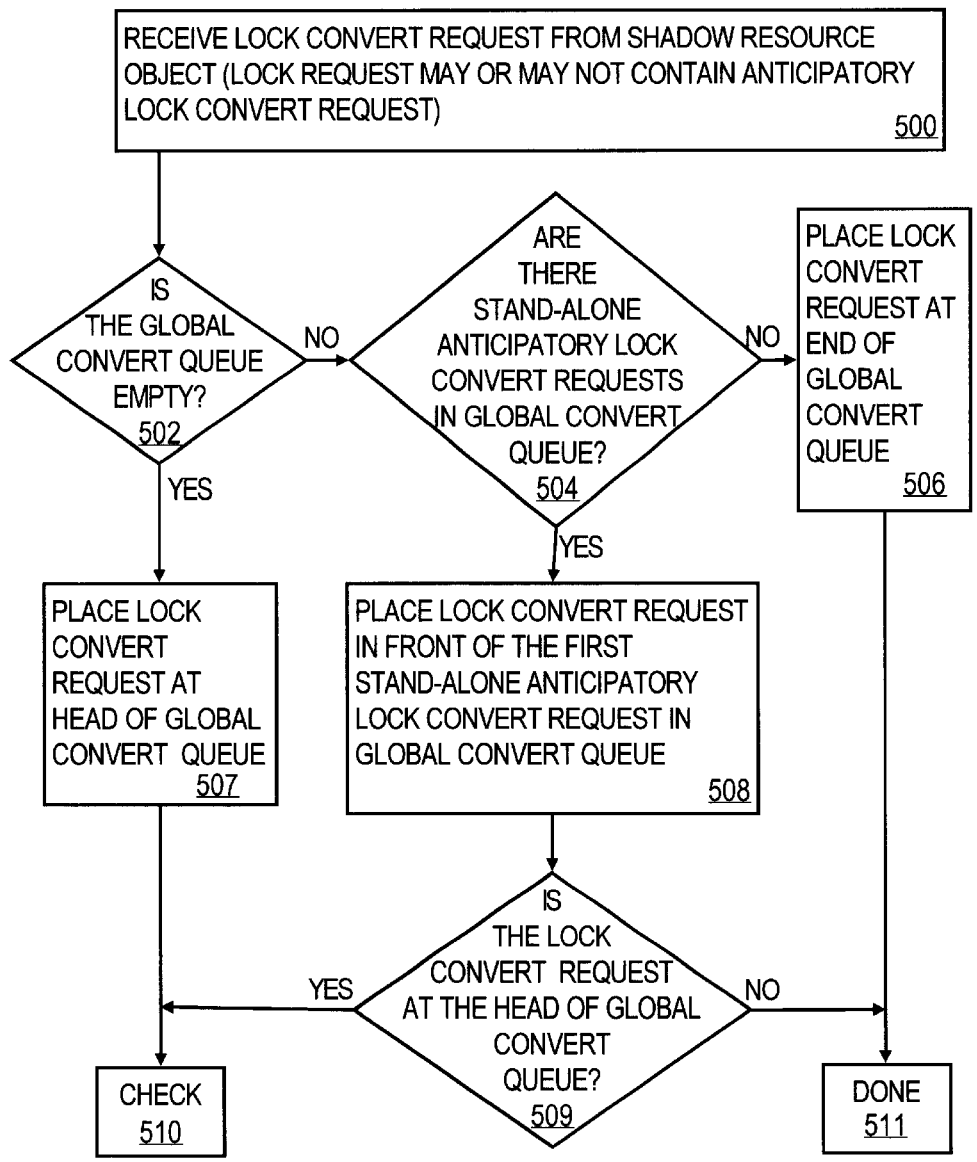
FIG. 5A is a flow chart illustrating one embodiment of steps performed by a master resource object upon receiving lock convert request from a shadow resource object.

FIG. 5A is a flow chart illustrating the steps performed by master resource object 306 upon receiving a lock convert request from a shadow resource object. The lock convert request received from the shadow resource object may or may not contain an anticipatory lock convert request. For the purposes of explanation, it shall be assumed that the master resource object 306 receives a request from shadow resource object 322 for lock 422 to be upgraded to a shared mode lock combined with an anticipatory lock convert request for an exclusive mode lock (step 500). Recall that an anticipatory lock convert request is a request for a lock mode that is not immediately required by the requesting entity, but may be required for some operation that the entity may perform in the near future. The upgrade lock convert request indicates the type of lock the shadow resource object is holding, the type of lock conversion the shadow resource object currently requests, and the type of more restrictive mode indicated by the anticipatory lock convert request.

At step 502, the master resource object determines whether the global convert queue of the master resource object is empty. If the global convert queue is not empty, control passes to step 504. Otherwise, control passes to step 507.

At step 504, the master resource object determines whether there are any stand-alone anticipatory lock convert requests in the global convert queue. If there are no stand-alone anticipatory lock convert requests in the global convert queue, control passes to step 506 where the master resource object places the received lock convert request at the end of the global convert queue. This is done by having the master resource object 306 upgrade the lock held by the shadow resource object to the specified lock convert request and move it to the end of the global convert queue 416. In the present example, the master resource object moves lock 422 from granted queue 414 to the end of the global convert queue 416 and updates lock 422 from a NULL mode lock to the shared mode lock combined with an anticipatory exclusive mode lock. It should be noted that a subsequent convert request may override a previous lock convert request. For example, if shadow resource object 322 had previously requested an upgrade to an exclusive lock mode, step 506 would involve changing the exclusive lock mode request for shadow resource object 322 on the global convert queue 416 to the shared mode lock combined with an anticipatory exclusive mode lock. Next, control passes to step 511 where the process of queuing incoming requests is complete.

However, if there are stand-alone anticipatory lock convert requests in the global convert queue, then control passes to step 508 where the master resource object places the received lock convert request in front of the first stand-alone anticipatory lock convert request found in the global convert queue. At step 509, the master resource object determines whether the received lock convert request is at the head of the global convert queue. If the master resource object determines that the received lock convert request is at the head of the global convert queue, then control passes to step 510. Otherwise, control passes to step 511 where the process of queuing incoming requests is complete.

If the global convert queue is empty upon receiving a lock convert request from a shadow resource object, then at step 507, the master resource object places the received lock convert request is at the head of the global convert queue. Control then passes to step 510.

Figure 5B:
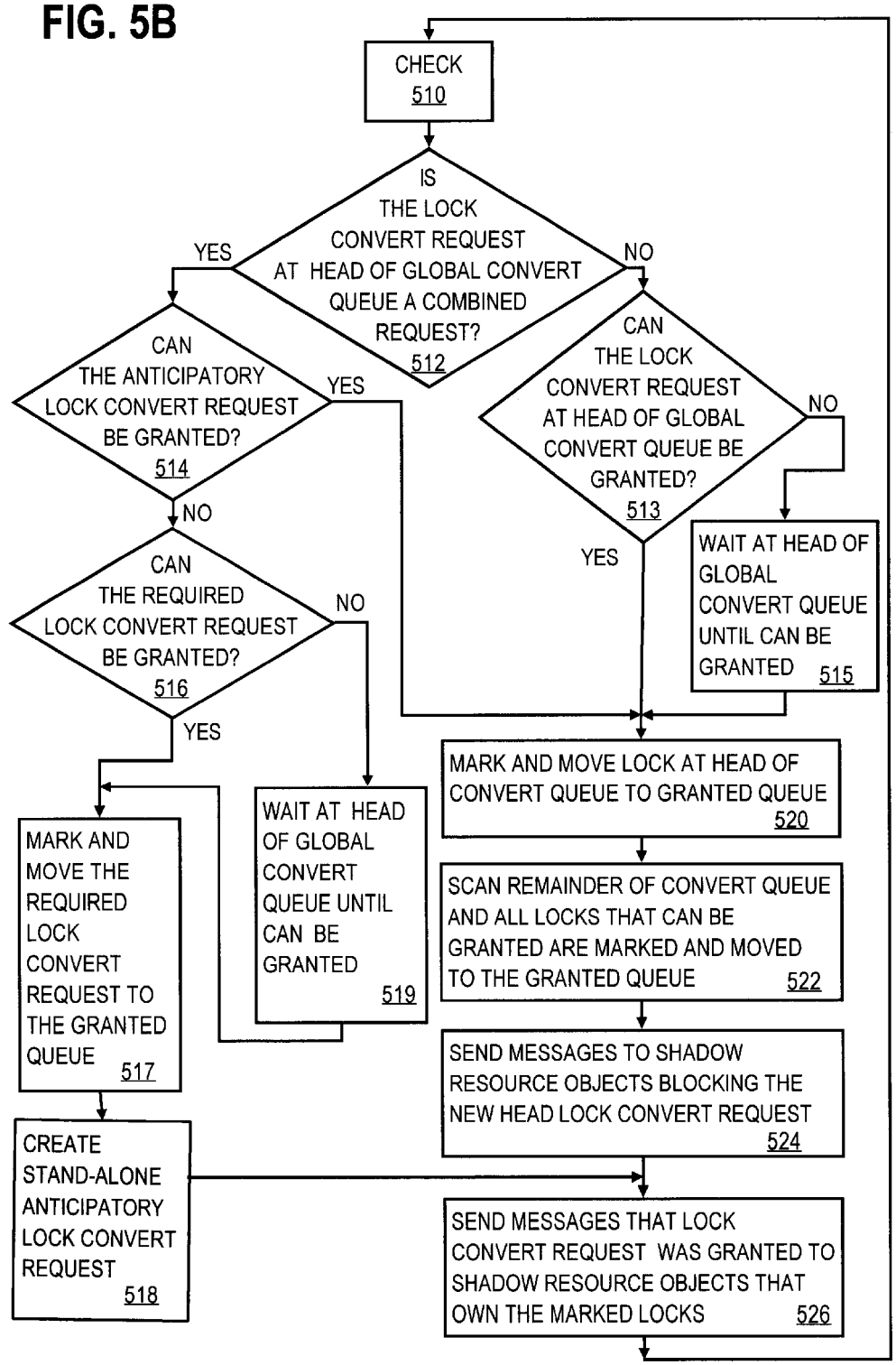
FIG. 5B is a flow chart illustrating one embodiment of steps performed by a master resource object with respect to lock conversions.

Referring to FIG. 5B, at step 510, the master resource object begins the process of checking whether the global head request can be granted. Control passes to step 512 where the master resource object determines whether the global head request is a combined lock convert request. If the global head request is a combined lock convert request, control passes to step 514. Otherwise, control passes to step 513.

At step 513, the master resource object determines whether the global head request can be granted. If the global head request can be granted then control passes to step 520. Otherwise, control passes to step 515.

At step 520, the master resource object marks and attaches the lock at the head of the global convert queue to the granted queue. In other words, in addition to granting the lock convert request by attaching it to the granted queue 414, the master resource object 306 marks the lock to indicate that a message is to be sent to the shadow resource object that owns the lock to inform it that the lock has been granted (see step 526 below).

At step 522, the master resource object scans the remainder of the requests on the global convert queue 416. All outstanding requests that can be granted are granted. As described above, the granting process involves moving the locks from the global convert queue 416 to the granted queue 414 and marking the locks to indicate that messages are to be sent to the owners of the locks (step 526 below).

At step 524, the master resource objects sends messages to any shadow resource objects that (1) own locks that are blocking the new global head request and (2) have not already been implicitly informed that they are blocking global head request. These messages indicate the mode requested by the global head request. At step 526, the master resource object sends messages to shadow resource objects that own the locks marked at steps 517, 520 and 522 to inform them that either their lock convert request is granted or their anticipatory lock convert request is granted. Control then proceeds back to step 510.

At step 515, the lock convert request waits at the head of the global convert queue until it can be granted. When the lock convert request waiting at the head of the global convert queue can be granted, control passes to step 520, followed by steps 522, 524 and 526 as explained above.

At step 514, the master resource object determines whether the anticipatory lock convert request specified in the combined lock convert request can be granted. If the anticipatory lock convert request can be granted, control passes to step 520, followed by steps 522, 524 and 526 as explained above. Otherwise, control passes to step 516.

At step 516, the master resource object determines whether the required lock convert request can be granted. If the required lock convert request can be granted, control passes to step 517. Otherwise, control passes to step 519. At step 517, the master resource object marks the required lock convert request and then grants the required lock request by moving it to the granted queue. Next, control passes to step 518 where the master resource object creates a stand-alone anticipatory lock convert request. Control then proceeds to step 526, previously explained above.

At step 519, the required lock convert request waits at the head of the global convert queue until it can be granted. When the required lock convert request waiting at the head of the global convert queue can be granted, control passes to step 517, followed by steps 518 and 526, previously explained above. After step 526, control proceeds back to step 510.

OPERATION OF SHADOW RESOURCE OBJECTS

Shadow resource objects operate similar to master resource objects with the exceptions that (1) shadow resource object holds its own lock on the resources that it manages, and (2) a shadow resource object is not able to grant to a process a lock that is more restrictive than the lock held by the shadow resource object itself. In addition, shadow resource objects see only their own portion of the global convert queue, and store mode held data, global convert mode data, and master knowledge data.

Figures 1, 6A:
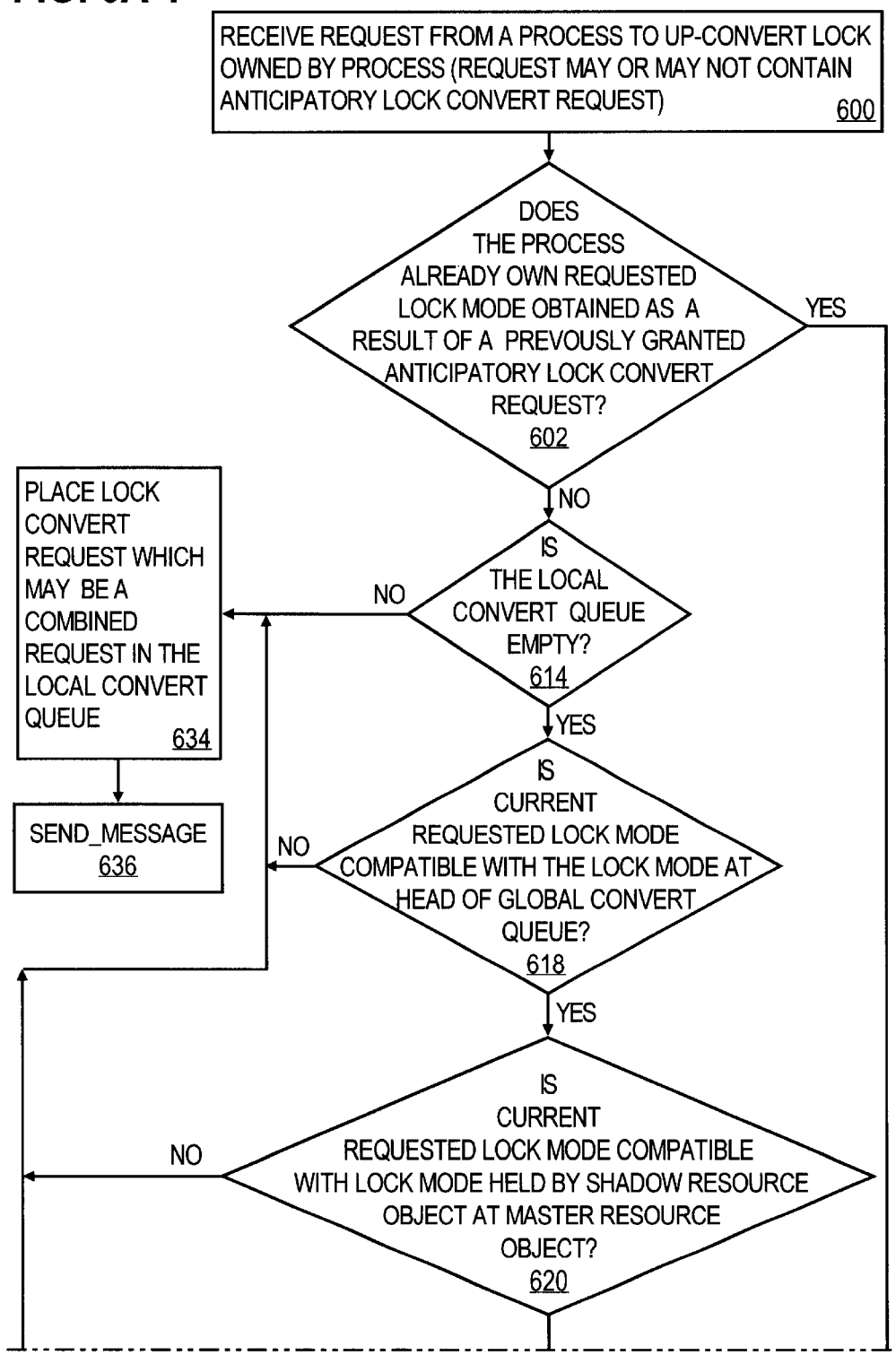
FIG. 6A is a flow chart illustrating one embodiment of steps performed by a shadow resource object upon receiving a lock upgrade request from a process.
Figures 2, 6A:
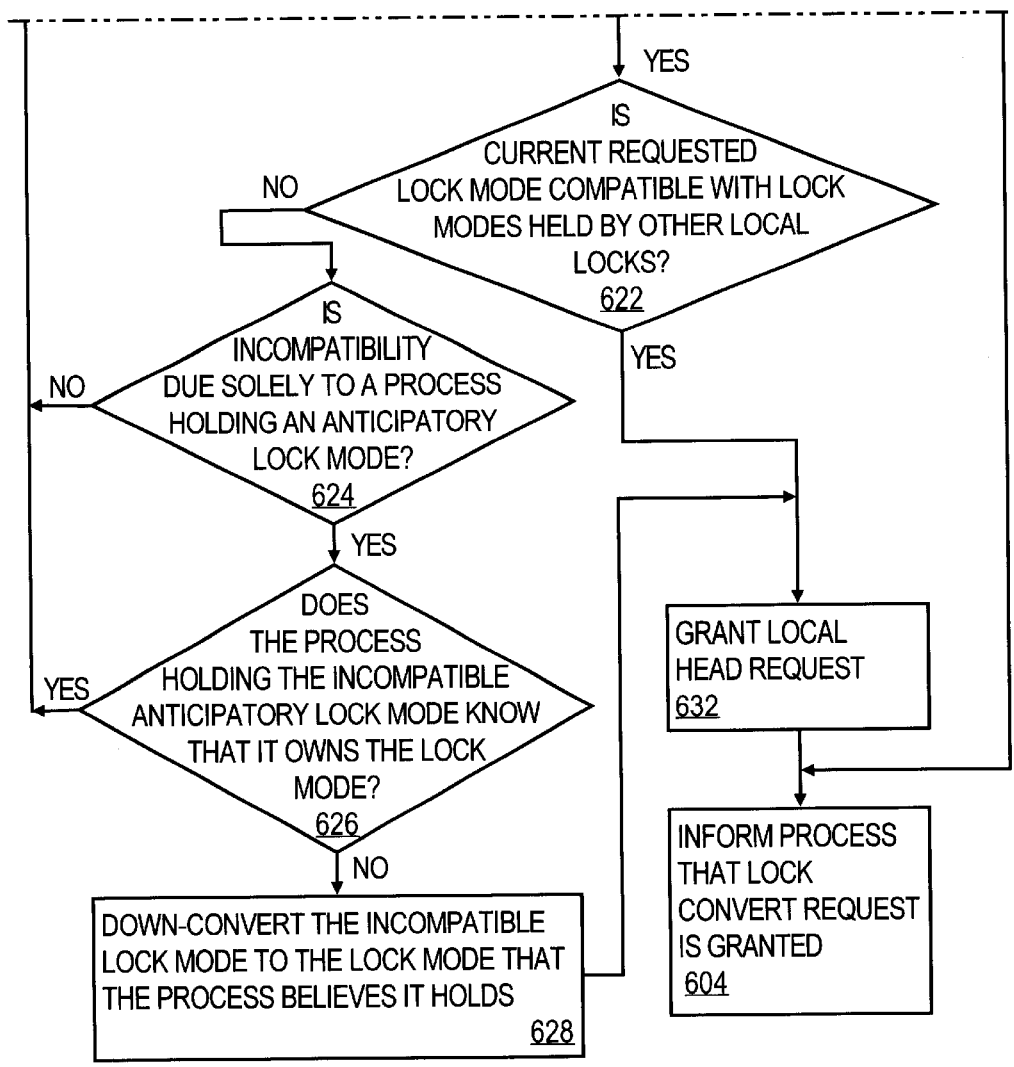
Figure 6A:
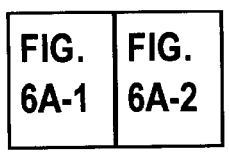
Figure 6B:
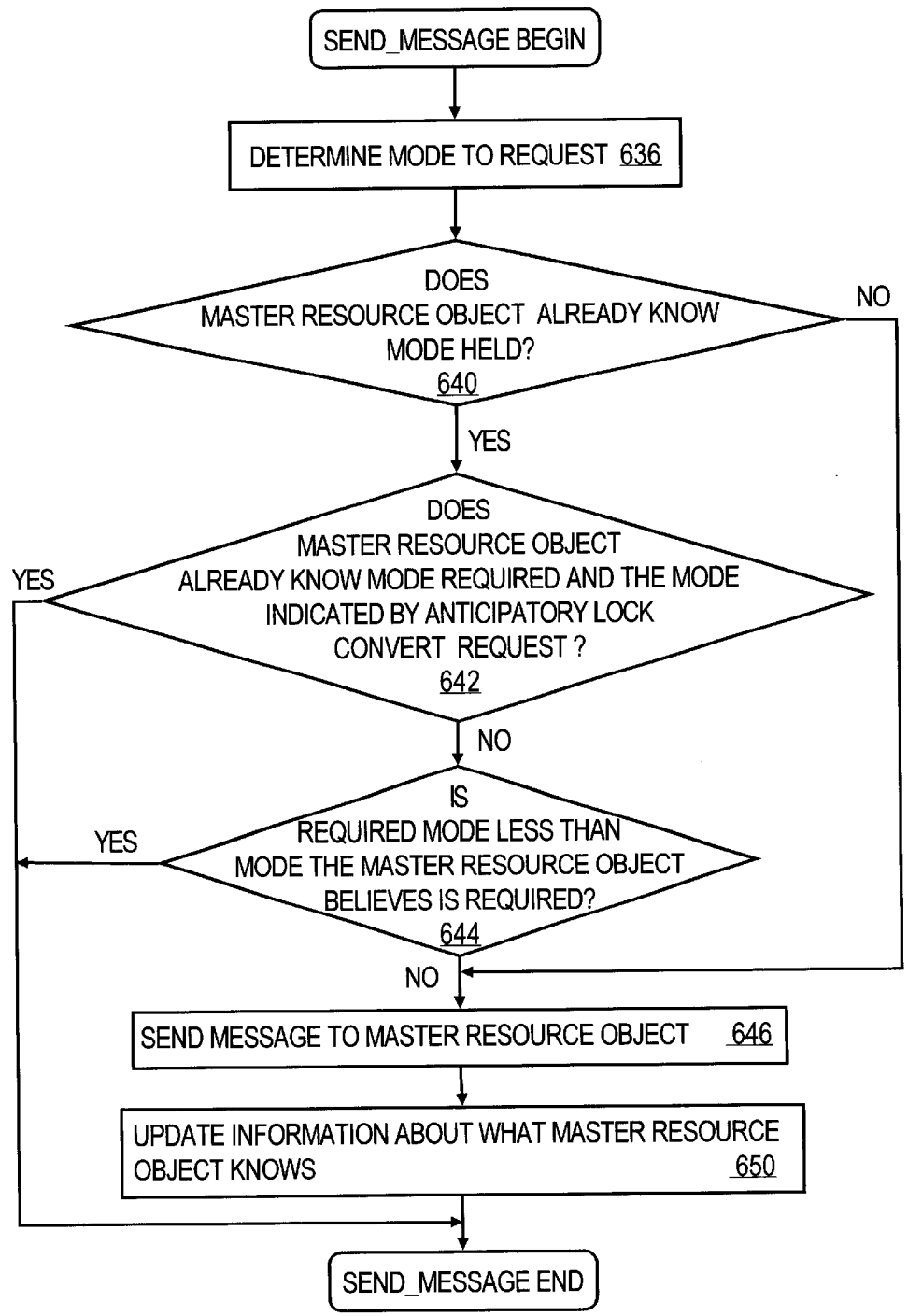
FIG. 6B is a flow chart illustrating one embodiment of the steps of sending messages from a shadow resource object to the master resource object.
Figure 6C:
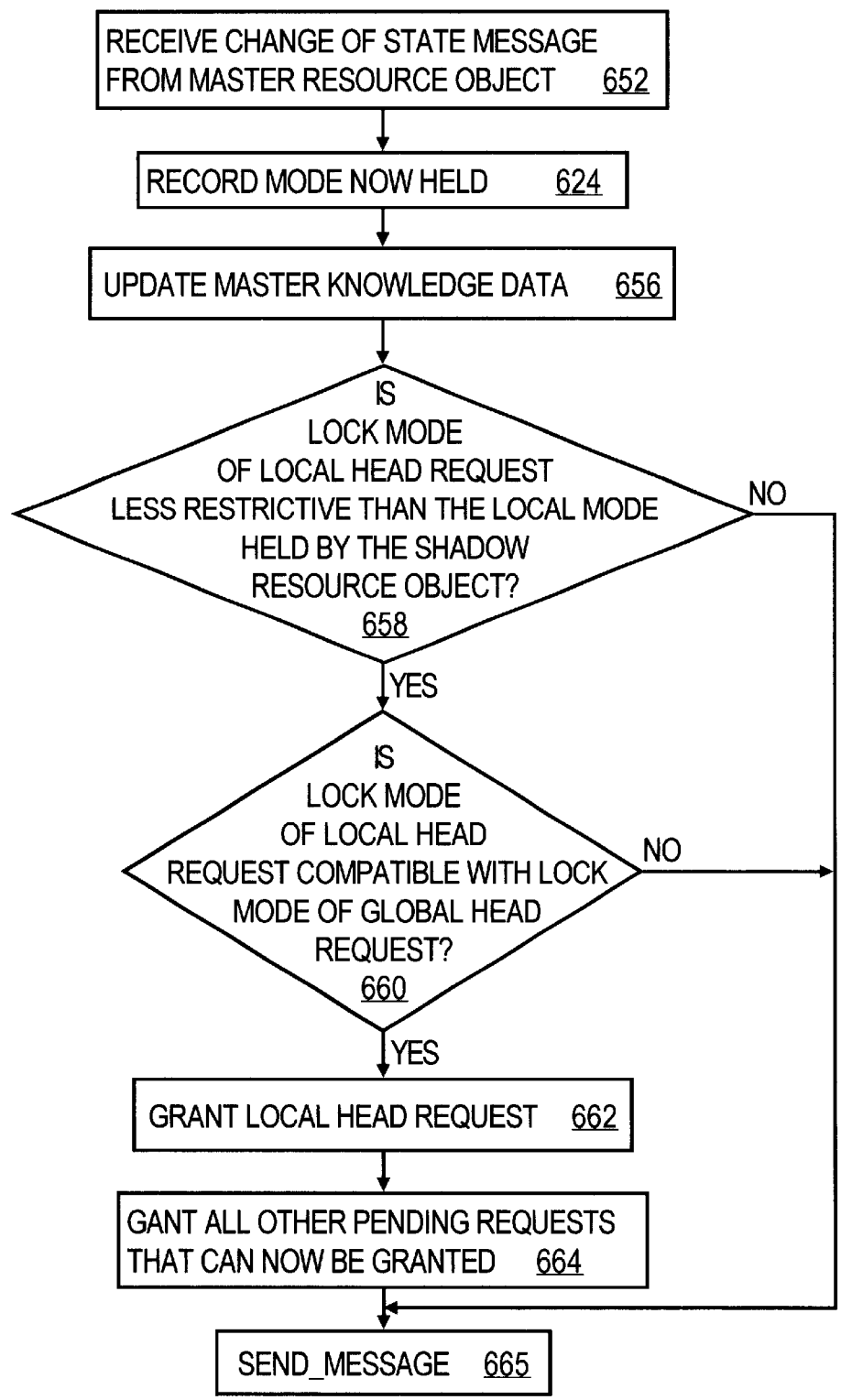
FIG. 6C is a flow chart illustrating one embodiment of steps performed by a shadow resource object upon being informed by a master resource object that a lock request has been granted.

FIGS. 6A to 6C are flow charts illustrating the operation of a shadow resource object upon receipt of a lock conversion request from a process. The operation of shadow resource objects shall now be described in greater detail with reference to FIG. 4, and FIGS. 6A to 6C.

UP CONVERT OPERATIONS

In FIG. 6A, at step 600, the shadow resource object receives a request from a process to up-convert the lock owned by the process. The request may or may not contain an anticipatory lock convert request. If the message received from a process at step 600 is a request to convert a lock to a more restrictive lock mode, control passes to step 602. At step 602, the shadow resource object determines whether the process already owns the requested lock mode. The process may already own the requested lock mode if, for example, the shadow resource object obtained a more restrictive lock mode for the process than the lock mode specified in a previous request by the process.

If it is determined that the process already owns the lock mode it is currently requesting, then control passes to step 604 where the shadow resource object informs the process that the required lock mode is granted granted. Otherwise, control passes to step 614.

At step 614, the shadow resource object determines whether its local convert queue is empty. If the local convert queue is empty, control passes to step 618. If the local convert queue is not empty, control passes to step 634.

At step 634, the up-convert request is placed on the local convert queue and a SEND_MESSAGE operation is performed at step 636. A shadow resource object can queue a convert request by converting the lock on the granted queue that is owned by the process to a convert request that it places on the convert queue. As the lock currently owned by the process is moved to the convert queue, a value is added to the lock (now a convert request) that indicates the mode to which the lock is to be converted.

As mentioned above, control proceeds to step 618 when the local convert queue is empty. At step 618, the shadow resource object determines whether the lock mode that is indicated in the received lock request is compatible with the mode that is requested by the global head request at the master resource object. For shadow resource object 320, the mode that is requested by the global head request is stored in global convert mode data 452. If the requested mode is compatible, then control passes to step 620. If the requested mode is not compatible, then control passes to step 634 where the received convert request is placed on the local convert queue and a SEND_MESSAGE operation is performed at step 636.

At step 620, the shadow resource object determines whether the lock mode that is indicated in the received lock request is compatible with the lock mode held by the shadow resource object at the master resource object. The lock mode held by the shadow resource object 320 is stored in mode held data 450. If the requested mode is compatible, then control passes to step 622. If the requested mode is not compatible, then control passes to step 634 where the convert request is placed on the local convert queue and a SEND_MESSAGE operation is performed at step 636.

At step 622, the shadow resource object determines whether the lock mode that is indicated in the received lock request is compatible with lock modes held by other local locks. If the requested mode is compatible, then control passes to step 632, where the up-convert request is granted. If the requested mode is not compatible, then control passes to step 624.

At step 624, the shadow resource object determines whether the incompatibility is solely due to a local process holding an incompatible anticipatory lock. If the incompatibility is not solely due to a local process holding an incompatible anticipatory lock, then the received convert request along with its anticipatory conversion request, if any, is placed on the local convert queue at step 634 and a SEND_MESSAGE operation is performed at step 636. Otherwise, control passes to step 626.

At step 626, the shadow resource object determines whether the process that is holding the incompatible anticipatory lock mode knows that it owns the incompatible lock mode. If it is determined that the process knows that it owns the incompatible lock mode, then the received convert request along with its anticipatory lock mode, if any, is placed on the local convert queue at step 634 and a SEND_MESSAGE operation is performed at step 636. However, if it is determined that the process does not know that it owns the incompatible lock mode, then control passes to step 628. If the process does not know that it owns the incompatible lock mode, then the process has not yet requested the more restrictive lock mode indicated by the anticipatory lock convert request that was sent with the original lock request for that process. If the process has already requested the more restrictive lock mode indicated by the anticipatory lock convert request that was sent with the original lock request for that process, then the shadow resource object would have informed the process that the more restrictive lock mode is already granted. See steps 602 and 604 above.

At step 628, the shadow resource object down-converts the incompatible lock mode to the lock mode that the owner-process believes it holds. Control then passes to 632 where the up-convert request is granted.

SEND_MESSAGE OPERATIONS

Preferably, each shadow resource object communicates as little as possible with the master resource object, thus minimizing the amount the inter-node communication. However, under the various conditions discussed above, shadow resource objects perform SEND_MESSAGE operations in which an inter-node message may be sent from the shadow resource object to the master resource object. When such a message is sent from a shadow resource object to the master resource object, the message always contains an indication of the lock mode that the shadow resource holds on the master resource object, the mode requested by the local head request, and the mode indicated by an anticipatory lock convert request, if any, contained in the local head request.

According to one approach, if it is possible for a shadow resource object to select a mode that (1) is compatible with modes held by local locks and (2) is compatible with the mode requested by the global head request then the shadow resource object is required to select a mode that is compatible with modes held by local locks and is compatible with the mode requested by the global head request. Referring to FIG. 6B, at step 636 a shadow resource object determines the mode that the shadow resource will request from the master resource object based on the guidelines described above.

At step 640, the shadow resource object determines whether the master resource object already knows the mode currently held by the shadow resource object. This determination is made by inspecting the master knowledge data stored on the same node as the shadow resource object. As mentioned above, the master knowledge resource data indicates what the master resource object currently "knows" about the shadow resource object. According to one embodiment, the master knowledge resource data indicates the information most recently sent by the shadow resource object to the master resource object.

If the master resource object does not already know the mode held by the shadow resource object, control passes to the step 646. For example, if the shadow resource object 320 holds a shared mode, and master knowledge data 454 indicates that master resource object 306 thinks that shadow resource object 320 holds an exclusive mode, then control passes to step 646. If the master knowledge data 454 indicates that the master resource object 306 already knows the mode held by the shadow resource object 320, then control passes to step 642.

At step 642, the shadow resource object determines whether the master resource object already knows the mode required by the shadow resource object, and in the case of a combined lock convert request, whether the master object already knows of the presence of the anticipatory lock convert request. The shadow resource object makes this determination by inspecting the master knowledge data stored on the same node as the shadow resource object. For example, the master knowledge data 454 may indicate that the last lock convert request sent by shadow resource object 320 to master resource object 306 requested a shared mode lock. If the shadow resource object 320 currently requires an exclusive mode lock, then the shadow resource object 320 determines that the master resource object 306 does not currently know the mode required by shadow resource object 320.

If the master resource object already knows both the currently held mode, the currently required mode, and the currently anticipated mode, if any, then there is no need to send a message to the master resource object and the SEND_MESSAGE operation is complete. Otherwise, control passes to step 644.

At step 644, it is determined whether the mode required by the shadow resource object is less restrictive than the mode that the master resource object currently believes is required by the shadow resource object. In the case of a combined lock convert request, it is determined whether the mode indicated by the anticipatory lock convert request is less restrictive than the mode the master resource object currently believes is required by the shadow resource object. If the required mode is greater than the mode that the master resource object believes is required, control passes to step 646.

In the illustrated embodiment, the SEND_MESSAGE operation is ended without the shadow resource object sending a message to the master resource object if the required mode is less than the mode that the master resource object believes is required. In the case where the lock convert request contained an anticipatory lock convert request, the SEND_MESSAGE operation is ended without the shadow resource object sending a message to the master resource object if the mode indicated by the anticipatory lock convert request is less restrictive than the mode that the master resource object currently believes is required by the shadow resource object. However, an alternative approach is to allow the shadow resource object to send a message to the master resource object under these conditions.

At step 646, the shadow resource object sends a message to the master resource object. The message indicates the mode currently held by the shadow resource object and the mode required by the shadow resource object along with the mode of anticipatory lock convert request, if any. At step 650, the shadow resource object updates the information about what the master resource object knows about the shadow resource object. For example, if the message sent in step 646 indicates that shadow resource object 320 holds a shared mode lock and requires an exclusive mode lock, then in step 650 shadow resource object 320 would update master knowledge data 454 to indicate that master resource object 306 knows that shadow resource object 320 holds a shared mode lock and requires an exclusive mode lock.

CHANGE STATE MESSAGE PROCESSING

When a master resource object grants a lock convert request sent by a shadow resource object or grants the anticipatory lock convert request contained in a combined lock convert request, the master resource object sends a change state message to the shadow resource object to inform the shadow resource object that the lock convert request or the anticipatory lock convert request has been granted (step 526 of FIG. 5B). FIG. 6C is a flow chart illustrating the steps performed by a shadow resource object upon receiving such a change state message from the master resource object.

At step 652, the shadow resource object receives the change state message from the master resource object. At step 654, the shadow resource object records the mode that is now held by the shadow resource object. Specifically, this information is recorded in the mode held data that resides on the same node as the shadow resource object. At step 656, the shadow resource object updates the information that indicates what the master resource object knows about the shadow resource object.

At step 658, the shadow resource object determines whether the lock mode specified in the convert request that is at the head of the local convert queue (the "local head request") is less restrictive than the lock mode held by the shadow resource object. In the case of a combined lock convert request, the shadow resource object determines whether the lock mode indicated by the anticipatory lock convert request is less restrictive than the lock mode held by the shadow resource object. As mentioned above, the lock mode held by the shadow resource object is stored as mode held data on the same node as the shadow resource object. If the lock mode specified by the local head request or the anticipatory lock convert request, as the case may be, is less restrictive than the lock mode held by the shadow resource object, control passes to step 660. Otherwise, control passes to step 665.

At step 660, the shadow resource object determines whether the lock mode of the local head request or in the case of a combined lock convert request, the lock mode indicated by the anticipatory lock convert request is compatible with the lock mode specified by the global head request. The lock mode requested by the global head request is stored in the global convert mode data stored in the same node as the shadow resource object. If the lock mode of the local head request or in the case of a combined lock convert request, the lock mode indicated by the anticipatory lock convert request is compatible with the lock mode of the global head request, then control passes to the step 662. Otherwise, control passes to step 665.

At step 662, the shadow resource object grants the local head request, or in the case of a combined lock convert request, the shadow resource object grants the lock mode indicated by the anticipatory lock convert request. The shadow resource object grants the local request by removing the request from the head of the local convert queue, placing the request as a granted lock on the granted queue and informing the process associated with the local head request that the process has been granted the lock mode that the process requested. In the case of a combined convert request, the shadow resource object grants the lock mode indicated by the anticipatory lock convert request by removing the lock request indicated by the anticipatory lock convert request from the head of the local convert queue and placing the request as a granted lock on the granted queue. However, even though the more restrictive lock mode indicated by the anticipatory lock convert request is granted, the shadow resource object informs the process associated with the local head request that the process has been granted the lock mode that the process requested and does not mention that the more restrictive lock mode indicated by the anticipatory lock convert request has been granted. At step 664, the shadow resource object grants all other pending lock requests that can now be granted. At step 665, a SEND_MESSAGE operation is performed.

BLOCKING MESSAGE PROCESSING

Figure 7:
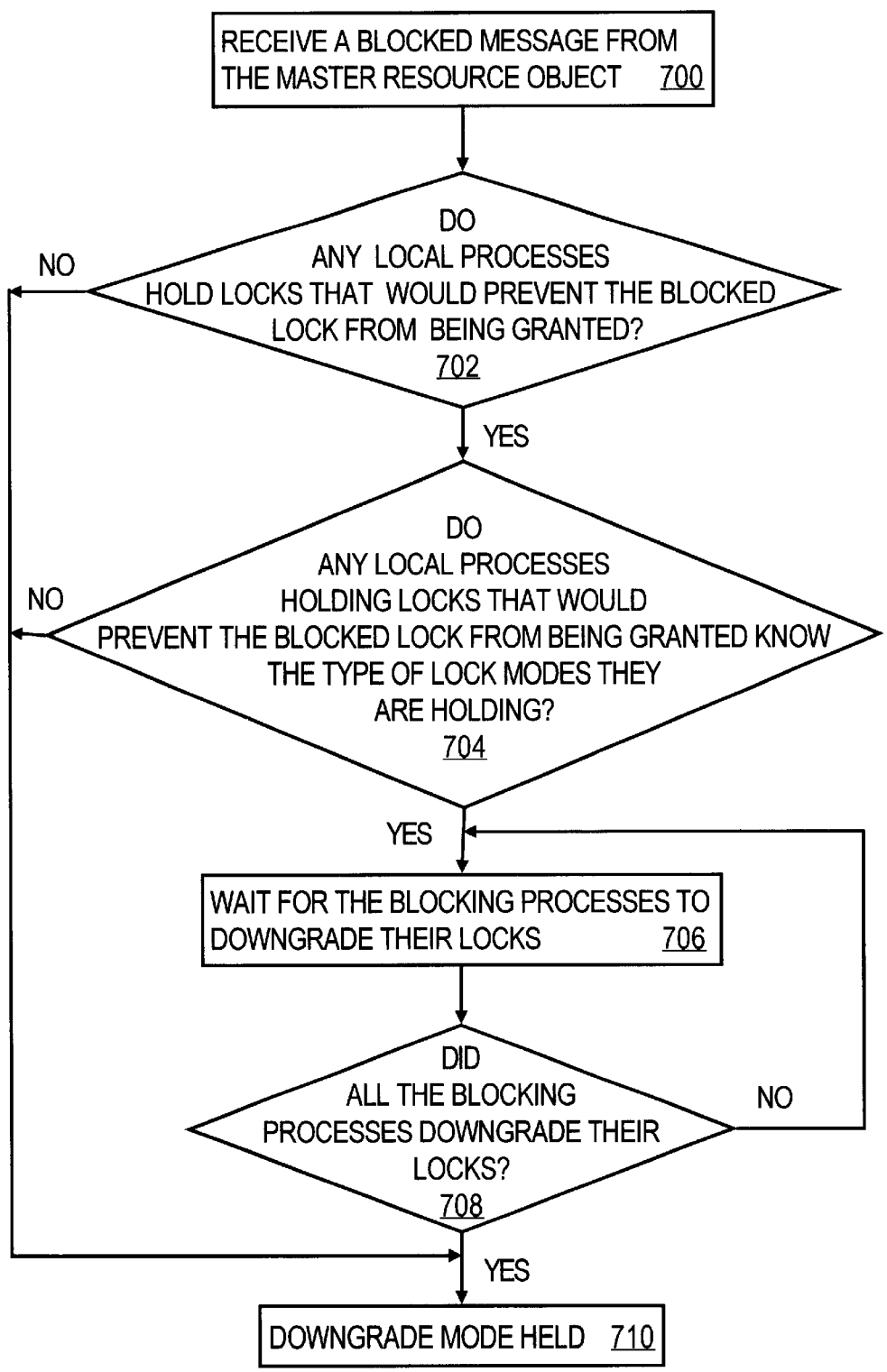
FIG. 7 is a flow chart illustrating one embodiment of steps performed by a shadow resource object upon being informed by a master resource object that a lock held by the shadow resource object is blocking a lock requested by another shadow resource object.

FIG. 7 is a flow chart illustrating the steps performed by a shadow resource object upon receipt of a message from the master resource object that informs the shadow resource object that the global head request is blocked by the lock held at the master resource object by the shadow resource object. For example, in FIG. 4, shadow resource objects 322 and 324 own NULL locks on TABLE_1, and shadow resource object 320 owns an exclusive lock 420 on TABLE_1. Assume that shadow resource object 322 desires to obtain a shared mode lock on TABLE_1. As explained above with reference to FIG. 5B, the master resource object 306 will transmit a message to shadow resource object 320 when master resource object 306 determines that the lock 420 held by shadow resource object 320 is blocking the master resource object 306 from granting the lock requested by shadow resource object 322.

At step 700, shadow resource object 320 receives the message from master resource object 306 that informs shadow resource object 320 that another shadow resource object has requested a shared mode lock on TABLE_1. Shadow resource object updates global convert mode data 452 to indicate that the mode requested by the global head request is now a shared mode lock.

At step 702, shadow resource object 320 determines whether any local processes hold locks that would prevent the global head request from being granted. If any local processes hold locks that would prevent the blocked lock from being granted, control passes to step 704. Otherwise, control passes to step 710.

At step 704, the shadow resource object determines whether any of the above local processes holding locks that would prevent the blocked lock from being granted know the type of lock modes they are holding. This is because some local processes may own lock modes that are more restrictive than the lock modes they believe they possess. As explained above, in some cases, the shadow resource object sent combined lock convert requests to the master resource object. In response, the master resource object granted the lock mode indicated by the anticipatory lock convert requests. If it is determined that any of the local processes holding locks that would prevent the blocked lock from being granted know the type of lock modes they are holding then control passes to step 706. This is because when a process actually requests for the more restrictive mode indicated by the anticipatory lock convert request, the shadow resource object would then inform the process that the more restrictive mode was already granted. Otherwise control passes to step 710.

At step 706, the shadow resource object waits for the blocking processes to downgrade their locks. At step 708, the shadow resource object determines if all the blocking processes have downgraded their locks. If it is determined that all the blocking processes have downgraded their locks then control passes to step 710. Otherwise, steps 706 and 708 are repeated until it is determined that all the blocking processes have downgraded their locks. According to one embodiment, the shadow resource object 320 may send messages to blocking processes to inform the processes that the locks that they hold are blocking a lock convert request.

At step 710, shadow resource object 320 downgrades the mode it holds to shared mode and updates mode held data 450 and master knowledge data 454, as described above, and transmits a downgrade request to the master resource object 306 to change lock 420 to a shared mode lock.

After master resource object 306 has downgraded lock 420 to a shared mode lock, master resource object 306 is able to upgrade lock 422 to a shared mode lock.

HARDWARE OVERVIEW

Figure 8:
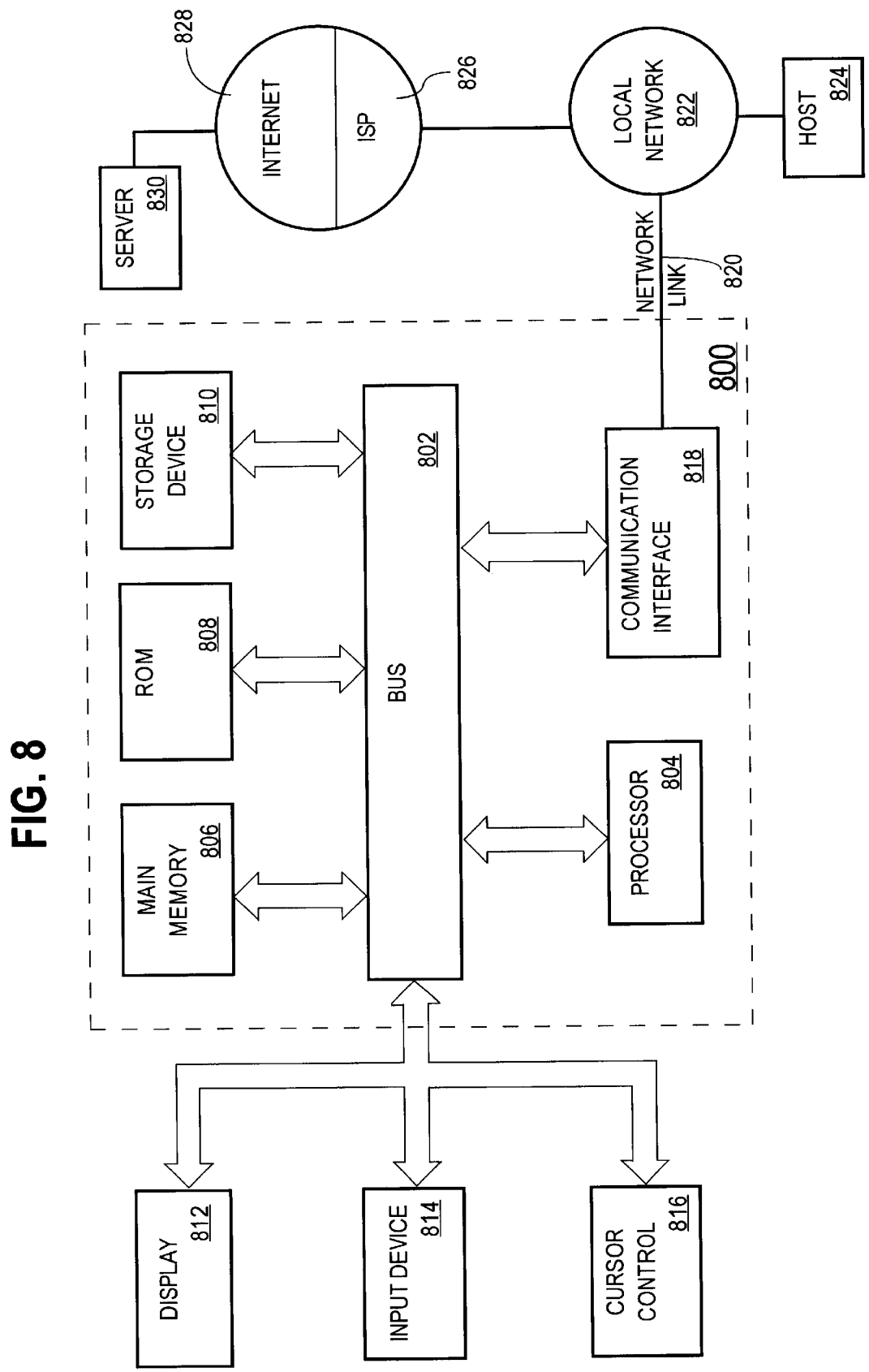
FIG. 8 is a block diagram of a computer system hardware arrangement that can be used to implement the invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing locks using techniques described herein. According to one embodiment of the invention, lock management is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for efficient resource accessing as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for granting locks on resources, the method comprising the steps of:

receiving from a requesting entity a lock request that includes a request for a first lock mode on a resource and an indication that the requesting entity may subsequently request a second lock mode on the resource, wherein the second lock mode is more restrictive than the first lock mode;

responding to the lock request by performing the steps of
determining whether a first set of conditions is satisfied;
if the first set of conditions is satisfied, then granting the second lock mode on the resource to the requesting entity;
if the first set of conditions is not satisfied, then determining whether a second set of conditions is satisfied;
if second set of conditions is satisfied, then granting the first lock mode on the resource to the requesting entity; and
informing the requesting entity that the lock request on the resource has been granted.

2. The method of claim 1 wherein the requesting entity is on a first node and the steps of receiving and responding are performed by a lock manager on a second node.

3. The method of claim 1 further comprising performing the following steps prior to receiving from the requesting entity the lock request:

determining whether the requesting entity may subsequently request the second lock mode on the resource; and upon determining that the requesting entity may subsequently request the second lock mode on the resource, including the indication in the lock request that the requesting entity may subsequently request the second lock mode.

4. The method of claim 3 wherein the step of determining whether the requesting entity may subsequently request the second lock mode on the resource includes employing predictive logic to predict a likelihood for a subsequent request for the second lock mode on the resource.

5. The method of claim 1 wherein the step of determining whether the first set of conditions is satisfied includes the steps of:

determining whether the second lock mode conflicts with any locks on the resource already granted to other entities;

determining whether the second lock mode conflicts with any pending lock request at the head of a lock request queue for the resource; and if the second lock mode neither conflicts with any locks on the resource already granted to other entities nor with a pending lock request at the head of the lock request queue for the resource, then the first set of conditions is satisfied.

6. The method of claim 1 wherein:

the requesting entity resides on a same node as a process;

the requesting entity sent the lock request for the benefit of the process; and in response to the requesting entity being informed that the second lock mode has been granted, the requesting entity informing the process that the first lock mode for the resource has been granted.

7. The method of claim 6 further including the step of waiting until the process subsequently requests the second lock mode for the resource, then informing the process that the second lock mode for the resource has been granted.

8. The method of claim 6 further including the step of:
if another process requests a lock mode on the resource conflicting with the second lock mode on the resource and the process has not yet requested the second lock mode for the resource, then automatically releasing the second lock mode on the resource without informing the process.

9. The method of claim 1 further including the step of:
if the first set of conditions is not satisfied and the second set of conditions is satisfied, then placing a lock request for the second lock mode on a lock request queue for the resource.

10. The method of claim 9 further comprising the steps of:
after placing the lock request for the second lock mode on the lock request queue for the resource, receiving a second lock request for a required lock mode; and
placing the second lock request for the required lock mode on the lock request queue ahead of the lock request for the second lock mode.

11. A computer-readable medium carrying one or more sequences of instructions for granting locks on resources, wherein execution of the one or more sequences of instructions by one or more processors causes the one or more processors to perform the steps of:
receiving from a requesting entity a lock request that includes a request for a first lock mode on a resource and an indication that the requesting entity may subsequently request a second lock mode on the resource, wherein the second lock mode is more restrictive than the first lock mode;
responding to the lock request by performing the steps of determining whether a first set of conditions is satisfied;
if the first set of conditions is satisfied, then granting the second lock mode on the resource to the requesting entity;
if the first set of conditions is not satisfied, then determining whether a second set of conditions is satisfied;
if second set of conditions is satisfied, then granting the first lock mode on the resource to the requesting entity; and
informing the requesting entity that the lock request on the resource has been granted.

12. The computer-readable medium of claim 11 wherein the requesting entity is on a first node and the steps of receiving and responding are performed by a lock manager on a second node.

13. The computer-readable medium of claim 11 further comprising performing the following steps prior to receiving from the requesting entity the lock request:
determining whether the requesting entity may subsequently request the second lock mode on the resource; and
upon determining that the requesting entity may subsequently request the second lock mode on the resource, including the indication in the lock request that the requesting entity may subsequently request the second lock mode.

14. The computer-readable medium of claim 13 wherein the step of determining whether the requesting entity may subsequently request the second lock mode on the resource includes employing predictive logic to predict a likelihood for a subsequent request for the second lock mode on the resource.

15. The computer-readable medium of claim 11 wherein the step of determining whether the first set of conditions is satisfied includes the steps of:
determining whether the second lock mode conflicts with any locks on the resource already granted to other entities;
determining whether the second lock mode conflicts with any pending lock request at the head of a lock request queue for the resource; and
if the second lock mode neither conflicts with any locks on the resource already granted to other entities nor with a pending lock request at the head of the lock request queue for the resource, then the first set of conditions is satisfied.

16. The computer-readable medium of claim 11 wherein:
the requesting entity resides on a same node as a process;
the requesting entity sent the lock request for the benefit of the process; and
in response to the requesting entity being informed that the second lock mode has been granted, the requesting entity informing the process that the first lock mode for the resource has been granted.

17. The computer-readable medium of claim 16 further including the step of waiting until the process subsequently requests the second lock mode for the resource, then informing the process that the second lock mode for the resource has been granted.

18. The computer-readable medium of claim 16 further including the step of:
if another process requests a lock mode on the resource conflicting with the second lock mode on the resource and the process has not yet requested the second lock mode for the resource, then automatically releasing the second lock mode on the resource without informing the process.

19. The computer-readable medium of claim 11 further including the step of:
if the first set of conditions is not satisfied and the second set of conditions is satisfied, then placing a lock request for the second lock mode on a lock request queue for the resource.

20. The computer-readable medium of claim 19 further comprising the steps of:
after placing the lock request for the second lock mode on the lock request queue for the resource, receiving a second lock request for a required lock mode; and
placing the second lock request for the required lock mode on the lock request queue ahead of the lock request for the second lock mode.

* * * * *